June 6, 1950     R. M. ULRICH     2,510,611
BUCKET RETURN FOR TRACTOR LOADERS
Filed Aug. 23, 1948
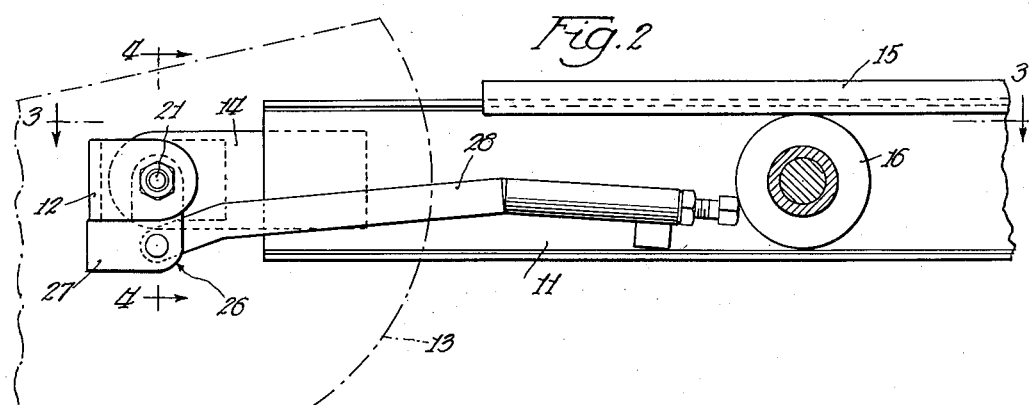
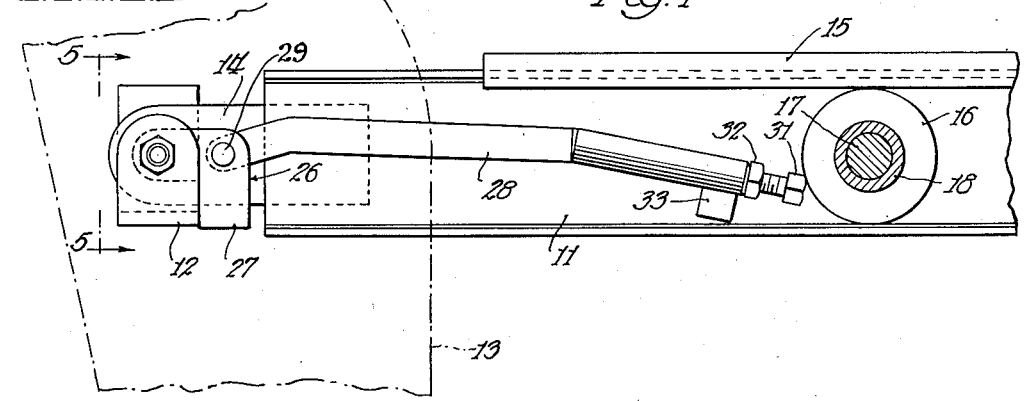
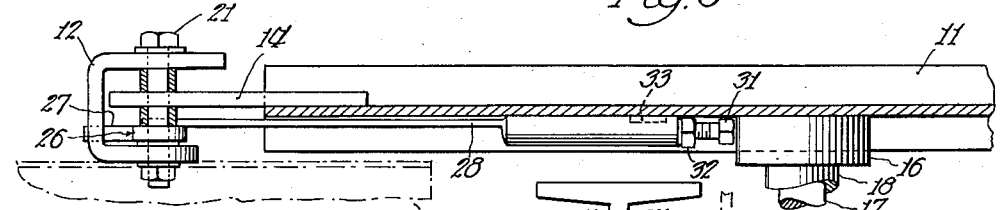
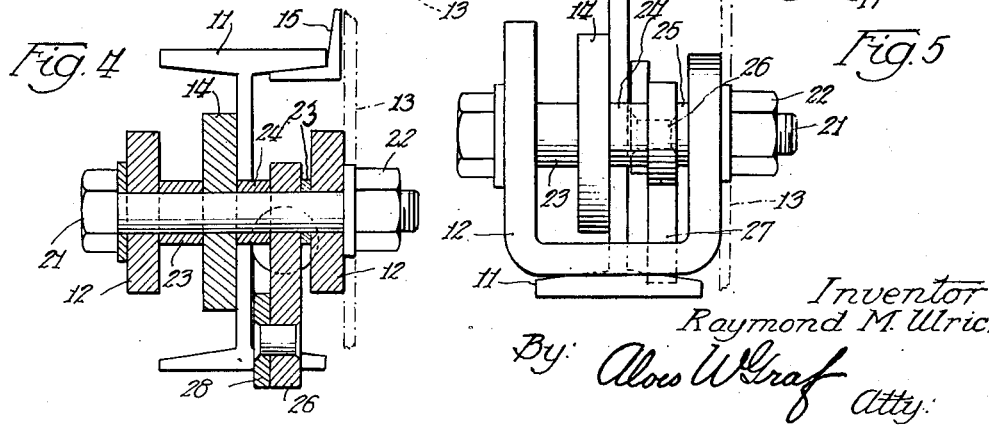
Inventor
Raymond M. Ulrich
By Alois W. Graf Atty.

Patented June 6, 1950

2,510,611

UNITED STATES PATENT OFFICE 2,510,611

BUCKET RETURN FOR TRACTOR LOADERS

Raymond M. Ulrich, Roanoke, Ill.

Application August 23, 1948, Serial No. 45,640

4 Claims. (Cl. 214—140)

1

The present invention relates to a loader for a tractor and more particularly to a mechanism for returning the bucket of a tractor loader.

In my co-pending patent applications Serial Number 758,299, Loader for tractor, and Serial Number 758,300, Bucket for tractor loader, both filed July 1, 1947, there is shown a tractor loader having a bucket or shovel which may be tripped in order to unload the loader. In such tractor loader the elevating mechanism was lowered so that the bucket engaged the ground, thereby to cause it to be restored to its original position whereupon a latching mechanism engaged the bucket to hold it in such position during the time that the bucket was being loaded and the load was being elevated.

For certain operations it would be desirable to have an arrangement whereby the bucket would be returned to its load carrying position prior to the time that the bucket reaches the ground. It is believed that this will be self-evident to anyone where the tractor loader is to pick up material or portions of a load at a height some distance above the ground. It, therefore, became highly desirable to provide a relatively simple mechanism which would accomplish the desired result without materially increasing the cost of the tractor loader.

It, therefore, is an object of the present invention to provide a relatively simple mechanism for returning the bucket of a tractor loader to its load carrying position without necessitating the engagement of the bucket with the ground.

Other and further objects of the present invention subsequently will become apparent by reference to the following description taken in conjunction with the accompanying drawings wherein:

Fig. 1 is a side view of the bucket return mechanism when the bucket is in unloading position;

Fig. 2 is a side view similar to Fig. 1 showing the bucket in load carrying position;

Fig. 3 is a plan view of the mechanism shown in Fig. 2 as seen in the direction of the arrows along the line 3—3 of Fig. 2;

Fig. 4 is a view partially in cross-section as seen in the direction of the arrows along the line 4—4 of Fig. 3; and Fig. 5 is a view as seen in the direction of the arrows along the line 5—5 of Fig. 1.

The loader of the type referred to has two parallel load carrying beams which are of I-beam or channel construction, carrying at their outer extremities a pivotally supported bucket. The

2

I-beams are pivotally connected to a suitable support arranged in the proximity of the rear of the tractor. A pair of bell crank levers raise and lower the I-beams by means of rollers which travel within the channel of the beams. One of the I-beams 11 is provided with a bucket return mechanism which is connected to the U-shaped pivotal support 12 which is welded to the side of the bucket. For the sake of clarity in the disclosure the bucket 13 has been illustrated only by dash-dot lines. Each of the I-beams 11 carries at its outer extremity an apertured extension plate 14 which is welded to the web of the I-beams 11. The I-beam 11 on its inner upper flange is provided with an angle iron 15 welded into position. The angle iron 15 serves to provide a flat surface for engagement by a roller 16 positioned within the channel portion of the I-beam 11. The roller 16 is carried by a shaft 17 which fits within a tubular member or pipe 18 which extends between the two parallel I-beams 11. The tubular member 18 is engaged by lifting arms or bell cranks actuated from a suitable source of power such as a pair of hydraulic pistons and cylinders.

When the beams 11 are raised to their upper position the rollers 16 are considerably to the left of the position shown in Fig. 1. As the beams are lowered the rollers 16 travel toward the right until they reach a position substantially that shown in Fig. 2. As the beams continue to be lowered the rollers 16 again move toward the right.

The U-shaped members 12 which are welded to the bucket 13 are provided with suitable apertures for receiving a bolt 21 which is held in position by a nut 22. The bolt 21 passes through a suitable opening in the beam extension member 14 so as to pivotally mount the bucket between the outer extremities of the beams 11. A suitable spacing washer or collar 23 is provided between one side of the extension member 14 and the U-shaped support 12.

Between the other side of the extension member 14 and the U-shaped support 12 there are provided a plurality of spacing collars or sleeves 24 and 25 between which is mounted a member 26. The member 26 has welded thereto a plate or arm 27 extending at right angles thereto. The arm 27 as is apparent from Fig. 5 as well as from Figs. 1 and 2 engages the U-shaped member 12 for the purpose of restoring the bucket 13 from unloading position to load carrying position.

Pivotally connected to the member 26 is an arm 28 held in position by a suitable connection such as a rivet. The arm 28 at its outer end is connected to a cylindrical or tubular portion 29 which has a threaded bore for receiving a cap screw 31 which may be held in adjusted position by a lock nut 32. By means of the cap screw 31 and the lock nut 32 the effective length of the member 28 may be varied to obtain proper operation of the bucket return mechanism. This adjustment is provided since the tractor loading mechanism may be arranged to have different ranges of travel of the arm 11 by adjusting the length of the arm which carries the cross-member 18 and the rollers 16. The adjustment also serves its purpose for accommodating the variations found between loaders adapted for different makes of tractors. The outer tubular portion 29 of the arm 28 is supported by a projecting lug 33 which bears against the inner surface of one channel of the I-beams 11. The member 33 therefore travels along the flange of the I-beams so as to keep the effective extremity 31 of the member 28 in such position that it may be acted upon by the rollers 16.

It will be recognized that the member 28 together with the member 26 comprises a crank mechanism for returning the bucket to load carrying position by engaging the U-shaped support of the bucket 13 or any other suitable projection provided on the bucket 13 for this purpose.

Assuming that the bucket 13 has been unloaded and that the pivoted arms or I-beams 11 are being lowered, the position is substantially that shown in Fig. 1. In this figure the roller 16 is just in engagement with the extremity 31 of the member 28 so that the member 27 is in engagement with the U-shaped member 12 which is attached to the bucket. A further movement of the roller 16 toward the left as seen in Fig. 1 will cause the member 27 to rotate until the position of the parts is substantially that shown in Fig. 2. When the parts approach the position shown in Fig. 2 the latching mechanism normally provided for holding the bucket 13 in load carrying position will be engaged so as to retain the bucket in this position. A subsequent lowering of the beam 11 produces a movement of the roller 16 toward the right but the bucket 13 remains in load carrying position. From this it is apparent that a relatively simple attachment is provided for returning the bucket to load carrying position prior to the time that the bucket is lowered so as to be substantially in contact with the ground.

While for the purpose of illustrating and describing the present invention a preferred embodiment has been shown in the drawings, it is to be understood that the invention is not to be limited thereby since such variations in the arrangement of the components and in their construction is contemplated as may be commensurate with the spirit and scope of the invention set forth in the accompanying claims.

What I desire to protect by United States Letters Patent is claimed as follows:

1. In a tractor loader having a pair of beams pivotally mounted adjacent their ends, a bucket pivotally mounted at their free ends, means for raising and lowering said beams including rollers traveling within the channel portion of said beams, a member pivotally mounted adjacent said bucket at the end of one of said beams, a rod pivotally connected to said member, said rod being arranged to move within the channel portion of one of said beams whenever the end thereof is engaged by one of said rollers, and means mounted on said bucket for engagement by said pivotally mounted member, whereby the position of said bucket may be changed.

2. In a tractor loader having a pair of levers each pivotally mounted at one end on the tractor, means for raising and lowering said levers including rollers arranged to support the free ends of said levers, said rollers being arranged to travel in a path along the lever adjacent the free end thereof, a bucket pivotally mounted at the extremities of said levers, a bucket engaging member pivotally mounted at the free end of one of said levers, a pitman pivotally connected to said member, the free end of said pitman being arranged to travel along a portion of said roller path and to be engaged by the roller therein thereby to produce actuation of said bucket.

3. In a tractor loader, the combination comprising a pair of levers each pivotally mounted at one end on the tractor, a bucket, means secured to said bucket for pivotally mounting said bucket between the free ends of said levers, means for raising and lowering said levers including lever means having supporting rollers in engagement with said levers in the proximity of their free ends, a pivoted member mounted to actuate with said bucket mounting means and arranged to engage said bucket mounting means, and a rod pivotally connected to said member said rod having its other end arranged to be engaged by one of said rollers and to travel in a path parallel to the path of travel of said roller.

4. In a tractor loader, the combination comprising a pair of levers each pivotally mounted at one end on the tractor, means for raising and lowering said levers including lever means having supporting rollers in engagement with said levers in the proximity of their free ends, a bucket, means secured to said bucket for pivotally mounting said bucket between the free ends of said levers, a pivoted member mounted coaxially with said bucket mounting means for engagement thereby, a rod pivotally connected to said member, said rod having its other end arranged to be engaged by one of said rollers and to travel in a path parallel to the path of travel of said roller, and means provided at the end of said rod for varying the effective length thereof.

RAYMOND M. ULRICH.

REFERENCES CITED

The following references are of record in the file of this patent:

UNITED STATES PATENTS

| Number | Name | Date |
| --- | --- | --- |
| 2,357,954 | Johnson | Sept. 12, 1944 |
| 2,395,622 | Galbreath | Feb. 26, 1946 |
| 2,457,049 | Lacey | Dec. 21, 1948 |
| 2,463,803 | Pilch | Mar. 8, 1949 |
| 2,465,476 | Pokorny et al. | Mar. 29, 1949 |